United States Patent [19]

Vogelsberg

[11] 4,224,788
[45] Sep. 30, 1980

[54] APPARATUS FOR SZ TWISTING TWIST ELEMENTS OF ELECTRIC CABLES AND LINES AS WELL AS METHOD OF OPERATING THIS APPARATUS

[75] Inventor: Dieter Vogelsberg, Coburg, Fed. Rep. of Germany

[73] Assignee: Siemens Aktiengesellschaft, Munich, Fed. Rep. of Germany

[21] Appl. No.: 21,181

[22] Filed: Mar. 16, 1979

[30] Foreign Application Priority Data

| | | |
|---|---|---|
| Mar. 23, 1978 [DE] | Fed. Rep. of Germany | 2813491 |
| Jul. 28, 1978 [DE] | Fed. Rep. of Germany | 2833698 |
| Jul. 28, 1978 [DE] | Fed. Rep. of Germany | 2833701 |
| Jan. 8, 1979 [DE] | Fed. Rep. of Germany | 2900729 |

[51] Int. Cl.³ ............................................. H01B 13/04
[52] U.S. Cl. ................................................... 57/294
[58] Field of Search ................................... 57/293, 294

[56] References Cited

U.S. PATENT DOCUMENTS

| | | | |
|---|---|---|---|
| 3,491,525 | 1/1970 | Sugi | 57/294 |
| 4,056,925 | 11/1977 | Vogelsberg | 57/293 |
| 4,127,982 | 12/1978 | Braun et al. | 57/294 |

*Primary Examiner*—John Petrakes
*Attorney, Agent, or Firm*—Kenyon & Kenyon

[57] ABSTRACT

In apparatus for SZ twisting twist elements of electric cables so that twisted units, in which the distance between the reversal points of the twist direction is about 500 to 1000 m, can be manufactured with apparatus of relatively short overall length, the basically straight accumulator section of the SZ twisting machine is divided into several subsections arranged in different, preferably parallel planes and connected to each other by deflection devices. The devices provided for guiding and deflecting the material to be twisted make possible or ensure the rotation of the material to be twisted in the region of the individual subsections of the accumulator.

22 Claims, 14 Drawing Figures

APPARATUS FOR SZ TWISTING TWIST ELEMENTS OF ELECTRIC CABLES AND LINES AS WELL AS METHOD OF OPERATING THIS APPARATUS

BACKGROUND OF THE INVENTION

This invention relates to the SZ twisting of twist elements of electric cables and lines in general, and more particularly to reducing the influence of the reversal points of the twist direction of the twist elements on the mechanical and/or electrical properties of the material to be twisted.

The development in the field of SZ twisting technology for electric cables and lines, which started at the beginning of the 1960s, has led to SZ twisting methods and SZ twisting machines, with which two to five twist elements can be twisted together without problem. Today, SZ twisting is used in the combined pair, triple or star quad base unit twisting of communication cables as well as for the twisting, with subsequent jacketing, of multiconductor power cables with conductor cross sections of up to 2.5 mm² which are to be permanently installed.

The use of SZ twisting is considered wherever a twisting operation and another operation can be combined. Besides the just mentioned fabrication cycles, this also applies to the twisting of flexible elements in combination with another operation, for instance, to the twisting and subsequent jacketing of the conductors of flexible lines, the conductors of which consist of stranded wire, or also to the twisting of litz conductors and the subsequent application (extrusion) of the insulation. Such flexible lines are, for instance, pairs, power cords for home appliances and connecting cords for telephone equipment.

The SZ twisting of the twist elements customary in practice is as a rule performed by means of accumulators, in which the material to be twisted, which has been assembled into a strand, is conducted in a stretched condition. The apparatus used consists of a first twisting point, e.g., a twisting closer, arranged at the entrance to the accumulator, and of a second twisting point (for instance, a twisting closer or a deflection pulley) arranged at the exit of the accumulator, and rotatable twisting heads which are arranged immediately behind the first twisting point and immediately ahead of the second twisting point, respectively. The axes of rotation of the twisting heads lie on the twisting axis, along which the twist elements assembled in a strand are also conducted. For the purpose of SZ twisting, either the direction of rotation of the two twisting heads or, with the direction of rotation remaining constant, only the speed of rotation of one or both twisting heads is varied at intervals which correspond to the running time of a cross section element of the material to be twisted from the first twisting point to the second twisting point (German Auglegeschrift No. 15 15 731; German Pat. No. 22 30 972). The change of the rotary movement of the twisting heads, as a rule, takes plae periodically in two steps, i.e., the rotary motion changes between clockwise and counterclockwise motion or between a low and a high speed of rotation. However, it is also known to vary the rotary motion of an accumulator constructed as a pulley accumulator in several steps within one twisting period. The distance between the reversal points of the twist direction in the finished twisted material can thereby be made larger than the storage length of the accumulator (German Offenlegungsschrift No. 18 01 055).

In the art of SZ twisting machines which have been developed more recently, and are now in use, in which the material to be twisted is conducted through the accumulator in stretched condition, the distance between the entrance and the exit of the accumulator and, therefore, between the twisting heads arranged at the entrance and the exit is about 2 to 10m. Since the rotary motion of the twisting heads is changed at intervals which correspond to the running time of a cross section element of the material through the accumulator, the distance between the reversal points of the twist direction in the finished twisted material is also about 2 to 10 m. These reversal points of the twist direction are mechanical as well as electrical weak points, since, on the one hand, the twist elements can untwist in the vicinity of the reversal points, and on the other hand, since the flexibility of the twist elements is reduced in the vicinity of the reversal points, and because the twist elements are arranged relatively untwisted relative to each other in the vicinity of the reversal points, a particularly strong electric coupling results there in communication cables. A number of measures is known which are aimed at reducing the negative effects of these reversal points while retaining the above-mentioned distance between the reversal points of the twist direction. For instance, it is known to twist the twist elements with a relatively short length of lay in the vicinity of the reversal points, or to let the distance between reversal points vary periodically about a mean value. However, it is also known to increase the distance between the reversal points of the twist direction considerably by selecting an accumulator with a very large storage length. The mechanical design proposed for this purpose provides a winding member, disposed coaxially with the twisting axis and oscillating about the latter, on which the material to be twisted is arranged in a multiplicity of turns around the twisting axis, and with which guide members are associated on both sides, with one winding the material to be twisted on the winding member and the other unwinding the material to be twisted from the winding member. The winding member itself is designed so that the turn of the material to be twisted, which has been put on at the one end, can be transported along the winding body to the other end thereof (German Offenlegungsschrift No. 16 85 842). Twisted material made on such an accumulator, i.e., material in which the reversal points of the twist direction have a large mutual distance, can be cut into short use lengths which have no reversal points of the twist direction. The design of the accumulator provided for this purpose is very elaborate. However, its design with respect to fixing those points of the material to be twisted, at which the winding direction of the storage element is changed, appears difficult, and the production speed would seem to be relatively low.

SUMMARY OF THE INVENTION

It is an object of the present invention to develop an SZ twisting machine for electric cables and lines in such a manner that relatively large distances of up to 500 or 1000 m between the reversal points of the twist direction are obtained in the finished twisted material, with high speed of production and relatively short overall length of the machine.

In the solution of this problem, the present invention starts out from an apparatus which, for SZ twisting of twist elements of electric cables and lines, contains an accumulator which is arranged between a stationary unwind device for the twist elements and a draw-off and take-up device for the twisted material and which consists of a first twisting point (twisting closer) arranged at the entrance of the accumulator, and of a second twisting point (twisting closer, deflection pulley) arranged at the exit of the accumulator, and of twisting heads; which are arranged immediately behind the first twisting point and immediately ahead of the second twisting point, respectively, and can be rotated at changing speeds, where the axes of rotation of the twisting heads lie on the twisting axis, along which the twist elements assembled in a strand are also conducted. According to the present invention, provision is made that:

(a) between the two twisting heads, several stationary guides for straight guidance and at least one stationary guide for deflecting the strand formed by the twist elements are arranged;

(b) the twisting heads and the straight guides are arranged in different planes and equiaxially in these planes;

(c) a guide for deflecting the strand is arranged between the last straight guide of a plane and the first straight guide of the next-following plane; and (d) at least the straight guides or part thereof can be rotated in the same direction as the twisting heads about the twisting axis and/or the guide surfaces of at least the straight guides or the other part thereof rest against the twist elements forming a strand, without force or nearly so in the circumferential direction thereof, i.e., there are means for preventing the development of friction between the straight guides and the twist elements.

In such a design of the accumulator of an SZ twisting machine, the originally straight storage section is divided into several sub-sections which are arranged at an angle to each other. These subsections which are connected to each other consecutively by guides for deflecting the strand, can be spatially related to each other in any desired manner, according to the space available in each case. For instance, two subsections can include an angle of 100° between them or three subsections can be arranged in a triangle or four subsections in a rectangle. Preferably, however, the subsections will be arranged in parallel planes because this requires the least space. In that case, the subsections are connected to each other via deflecting devices which deflect the twist material 180°, so that, overall, an approximately accordion shaped arrangement of the accumulator subsections is obtained. Thereby, the overall length basically required for long accumulator sections is reduced to a fraction of what it was. The overall length of the accumulator thus does not exceed the overall length of other machines required in the manufacture of electric cables and lines, or only significantly so. For instance, a required accumulator section of 100 m can be divided into ten subsections of 10 m length each, so that the overall length of the accumulator is only 10 m, or an accumulator length can be divided into six subsections of 40 m each. It can be taken in consideration here that the SZ twisting of twist elements is often followed by a manufacturing operation, in which a jacket is applied over the twisted elements by plastic extrusion and in which this plastic jacket is subsequently cooled in a cooling device. The commercially available cooling troughs for this purpose have overall lengths of, for instance, 20 to 50 m. If the new accumulator is used in the course of twisting and subsequent jacketing of twist elements, the accumulator could therefore be arranged parallel and next to the cooling device without thereby increasing the length of the overall manufacturing facility. This applies particularly if the new twisting apparatus is intended for the twisting of conductors for tubing, the use lengths of which are relatively short although they are produced in long production lengths, so that the reversal points of the twist direction in the finished line can be cut out without much loss of material or without leaving long leftover sections.

The effective storage length of the new SZ twisting apparatus can be increased by varying the rotary motions of the twisting heads which always revolve with constant direction of rotation not in only two steps as customary up to now, but in at least two increasing and in the same number of decreasing steps. Depending on the number of steps provided, the distance between reversal points of the twist direction present in the finished twisted material can be increased to several times the actual storage length of the accumulator. Uniform twisting of the twisted product is then obtained if the difference of the speed of rotation between two successive steps is always the same. For instance, by three inccreasing and three decreasing steps in the speed change of the twisting heads, i.e., with six steps within a twisting period, the distance between reversal points is increased to three times the storage length of the accumulator.

In an accumulator designed in accordance with the present invention, the twisting heads arranged at the entrance and the exit of the accumulator and the straight guides for the twist material are arranged in different planes. In the interest of the greatest possible storage length of the accumulator, it is advisable to arrange the straight guides in more than two parallel planes; the twisting head arranged at the entrance is then located in the first plane and the twisting head arranged at the exit in the last plane.

For accumulators of SZ twisting machines, in which the material to be twisted is conducted within the accumulator in stretched condition, i.e., on the twisting axis, it is characteristic that the material which is to be twisted and is conducted in stretched condition, executes a rotary motion about its own axis. The straight guides provided in the new accumulator and the guides for deflecting the strand must make possible or bring about such rotation of the stretched twisting material. As far as the straight guides are concerned, this can be achieved by making the inside diameter of the guides surrounding the twisting material larger than the twisting material, so that practially no forces act on the material to be twisted in the circumferential direction, or by having the straight guides rotate about the twisting axis with the material to be twisted. For this purpose, the straight guides themselves can be designed as rotatable twisting heads, or consist of rotatable tube sections. In order to ensure that the rotary motion of the twisting material is transmitted from one plane to the next in the region of the guides for deflecting the strand, a further twisting head can be arranged immediately before and behind each guide in accordance with a further embodiment of the present invention; these further twisting heads can then be rotated in the same direction as the twisting heads arranged at the entrance and the exit of the accumulator. The twisting heads can then be considered as straight guides or as parts of the guides for deflecting the strand. The deflection proper of the strand from one plane into the next plane, particularly into the next parallel plane, can be accomplished in this case by means of a single deflection pulley or roll, which can also be designed as a pull-off device. In that case, the material to be twisted is twisted open as far as possible when running up on the deflection pulley and is twisted closed again when running off the deflection pulley, so that the material to be twisted has the same twist condition in spite of the brief interruption of its rotary motion before and after the deflection pulley, and can continue its rotary motion after leaving the deflection pulley.

The rotary motion of the material to be twisted and thereby, its twist condition in the vicinity of the guides for deflecting the strand can also be transmitted by providing that, in addition to the guide surfaces of the straight guides, the guide surfaces of the guides for deflecting the strand also rest against the strand which continuously rotates about its axis, without or nearly without force in the circumferential direction thereof. Such deflection of the strand can be accomplished, for instance, by means of a flexible hollow shaft which can be rotated about its own axis, or by means of flexible tubes. Also, advantageous is a guide which consists of three or more guide rolls arranged on the arc of a circle, so that it is measured that the looping angle of the individual guide rolls is not more than 60°. If a larger number of deflection rolls is used, a driven twisting head for maintaining the rotary motion of the twist material can also be arranged between the deflection pulleys. If materials with a very small friction coefficient are available, the guide for deflecting of the strand can also consist of a runner.

A particularly advantageous design of the guides for deflecting the strand is obtained if they consist of several rolls or cylinders which are arranged on a circular arc and are set at an angle to the guide axis.

In such a guide, it is achieved, by setting the rolls at an angle, that the material to be twisted can execute a forced rotary motion about its own axis when running on the rolls or cylinders, i.e., the guide rolls, due to their inclined position, form a rotating drive for the material to be twisted, the driving force therefor being obtained by the motion of the material to be twisted in its longitudinal direction.

It may be advantageous to make the angle of inclination of the rolls or cylinders used for the guide, or their spatial position in the lengthwise direction of the guide axis of the twisting material, variable in order to adapt the rotary motion of the twisting material brought about by the rolls or cylinders to different speeds of rotation of the twisting heads of the SZ twisting apparatus. Variability of the angle of inclination can be obtained, for instance, by supporting the axes of the rolls or cylinders fixed and articulated at their one end, and movably in the direction of the guide axis of the material to be twisted at their other end (German Offenlegungsschrift No. 24 58 353).

Regarding the practical embodiment of such a deflection device, it is advisable to arrange the rolls or cylinders on a cylindrical support member. One can then proceed so that the deflection rolls or deflection cylinders are supported in two circular rings which contain bearings and which can be rotated independently of each other for changing the inclination of the axes of the deflection rolls or deflection cylinders.

Twisting machines are known per se, in which the twist elements are twisted in a double lay by means of a twisting yoke and in which the material to be twisted is deflected 180° within the twisting yoke by means of a device, which consists of several rollers or pairs of rollers which are arranged one behind the other in the train of the twisting yoke and are inclined relative to the guide axis of the material to be twisted. The use of such a device within the scope of an SZ-twisting machine which contains a stretched out accumulator divided into several subjection, is not suggested, however (German Auslegeschrift No. 15 10 091).

In the operation of the new SZ-twisting apparatus, large tension forces can act on the material to be twisted due to the repeated deflections of the material to be twisted within the accumulator. In order to reduce these tension forces, it is advantageous to arrange one or more pull off devices which can be rotated in the same direction as the twisting heads equiaxially to each one of the straight guides, between the two twisting heads arranged at the entrance and the exit. Such pull-off devices which would also change their rotary motion synchronously with the twisting heads, would at the same time assume the function of a straight guide.

In the practical mechanical design of the new accumulator, one will proceed so that the twisting heads arranged at the entrance and the exit of the accumulator and the further twisting heads arranged respectively before and after a guide for deflecting the strand are arranged in parallel planes on top of and/or next to each other. In that case it is also easily possible to drive the twisting heads arranged in one plane together; these twisting heads can revolve with the same speed or also with different speeds. The spacing between the two parallel planes in which the twisting heads are arranged, codetermines the storage capacity of the accumulator. In order to maximize the storage capacity, this spacing should be more than 20 m and preferably more than 30 m.

DETAILED DESCRIPTION OF THE INVENTION

Figure 1:
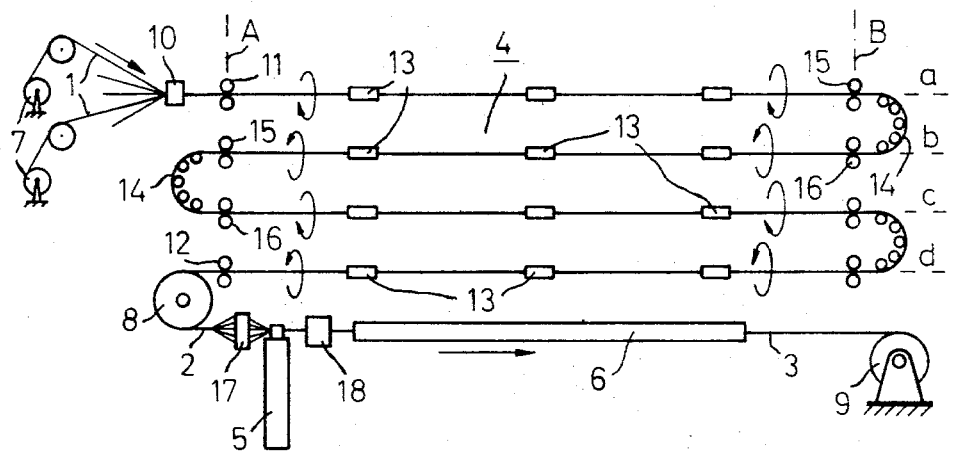
FIG. 1 is a diagrammatic view of the SZ-twisting apparatus of the present invention.

FIG. 1 shows a production machine which is used to fabricate a flexible tubing line by first twisting conductors 1 into a twisted unit 2 and immediately thereafter processing this twisted unit in the same operation into the line 3 by extrusion with a plastic jacket. The conductors 1 are twisted into the twisted unit 2 by means of the SZ twisting apparatus 4, while the plastic jacket is applied by means of the extruder 5 and the following water cooling device 6.

The conductors 1 which run from stationary conductor supplies 7 into the SZ twisting apparatus 4, are pulled through the same by means of a pull-off device 8 which is designed as a pulley drawing device, and the line 3 is finally wound up by means of the take-up device 9.

The SZ twisting device 4 is designed as an accumulator with the material to be twisted conducted in stretched condition along the twisting axis. In the length section contained in the accumulator a certain number of twist lays are always stored. The final twist condition of the twisted material is fixed upon leaving the accumulator. The accumulator consists, first, of a first twisting point 10 in the form of a twisting closer, into which the conductors 1 run arranged at the entrance. Immediately behind twisting point 10, a rotatable twisting head 11 is arranged, by which the twist elements are twisted together as they enter the accumulator. The second twisting point at the exit of the accumulator is formed by the draw-off pulley 8, i.e., the point where the twisted material runs onto the draw off device forms the second twisting point. Immediately ahead thereof, a second twisting head 12 is arranged, through the rotary motion of which the twisted material, upon leaving the accumulator, is imparted a second twist which provides the final twist, superimposed on the twist obtained at the entrance into the accumulator.

The twisting heads 11 and 12 are arranged in two different parallel planes a and d. In these planes as well as in the likewise parallel planes b and c in between, straight guides 13 are arranged for guiding the twist elements assembled into a strand 19. Guides 14 for deflecting the strand 19 by 180° from one plane to the next-following plane are arranged between the individual planes. By means of these guides for deflecting the strand, the latter runs through the entire accumulator in the manner of an accordion or a snake. With each guide 14 for deflecting the strand, two twisting heads 15 and 16 are associated, of which the one precedes the guide and the other follows the guide.

The take-off device 8 serves at the same time as a device for deflecting the strand 19 from the plane d into the plane of the water cooling device 6. Between the take-off device 9 and the extruder 5 following it, a known retwisting device 17 is arranged, by which possible skips of the conductors are corrected. Between the extruder 5 and the following water cooling device 6, there is a marking device 18, by means of which the extruded jacket is marked at those points, at which the reversal points of the twist direction come about which are obtained in the twisting of the conductors. This marking device is controlled via the rotary motion of the twisting heads 11 and 12.

The twisting heads 11 and 12 are arranged, together with the twisting heads 15 and 16, in two parallel planes A and B. This permits driving the twisting heads, which are arranged in the planes A and B, via a single drive. The distance between the two planes A and B, together with the number of planes a to d, determines the storage length of the accumulator. The distance between the planes A and B can be, for instance, 40 m, the straight guides 13 being arranged between the two planes at a spacing of 10 m each. With four parallel planes a to d, a total storage length of 160 m is thus obtained.

In the operation of the SZ twisting apparatus, the twisting of the conductors is determined essentially by the two twisting heads 11 and 12. These always rotate with constant direction of rotation and varying speed of rotation. This ensures that, within the accumulator, no reversal points of the twist direction occur, which could otherwise untwist under the influence of tensile stresses and at the deflection devices. In the operation of the twisting apparatus, it must be ensured that the strand 19 inside the accumulator can execute the rotary motion imparted by the twisting heads 11 and 12 unimpeded. The straight guides 13 and the guides 14 for deflecting the twisted material must be designed accordingly. If the straight guides 13 are of tubular design, they always rotate with the same direction of rotation, referred to the twisting axis, as the twisting heads 11 and 12 and change their speed of rotation synchronously with the twisting heads 11 and 12, which speed is equal or approximately equal to the speed of rotation of the twisting heads 11 and 12. The same applies to the twisting heads 15 and 16 associated with the guides 14, which can be considered as part of the guides 14 or also as the last or first straight guide within a plane. It is ensure particularly by the twisting heads 15 and 16 that the strand 19 can execute the necessary rotary motion about its own axis even in the vicinity of the guides 14.

Figure 2:
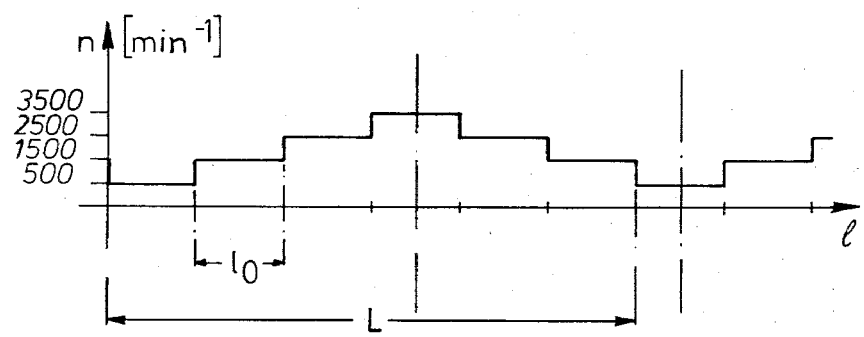
FIGS. 2 and 3 are diagrams helpful in understanding the operation of the device of FIG. 1.
Figure 3:
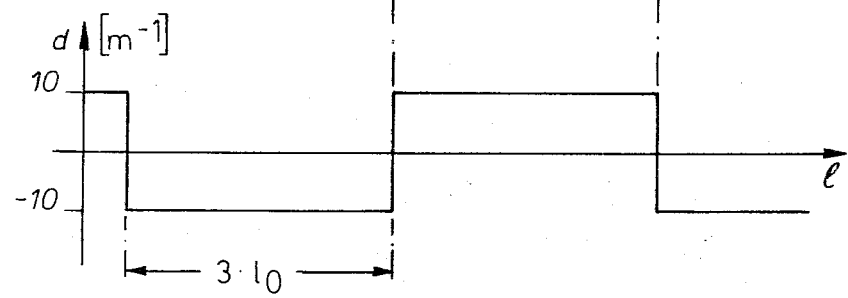

The rotary motions of the twisting heads 11 and 12 as well as of the straight guides 13 and the guides 14 for deflecting the strand 19 are advantageously changed during a period in several steps. An example for this is shown in FIGS. 2 and 3. FIG. 2 shows that the speed of rotation n of the twisting heads is changed at intervals which correspond to the total storage length $l_o$ of the SZ twisting apparatus 4, in three increasing and three decreasing steps each, the height of the individual steps preferably being chosen equal. For instance, the speed of rotation n can be changed during one SZ period L in steps of 500, 1500, 2500, 3500, 2500, 1500, 500 r.p.m. Such a change of speed in three increasing and three decreasing steps causes the distance between the reversal points of the twist direction in the completely twisted product to be three times the storage length of the SZ twisting apparatus 4, as is shown in FIG. 3. For a storage length of 160 m, the distance between the reversal points would be in this case 480 m.

Figure 4:
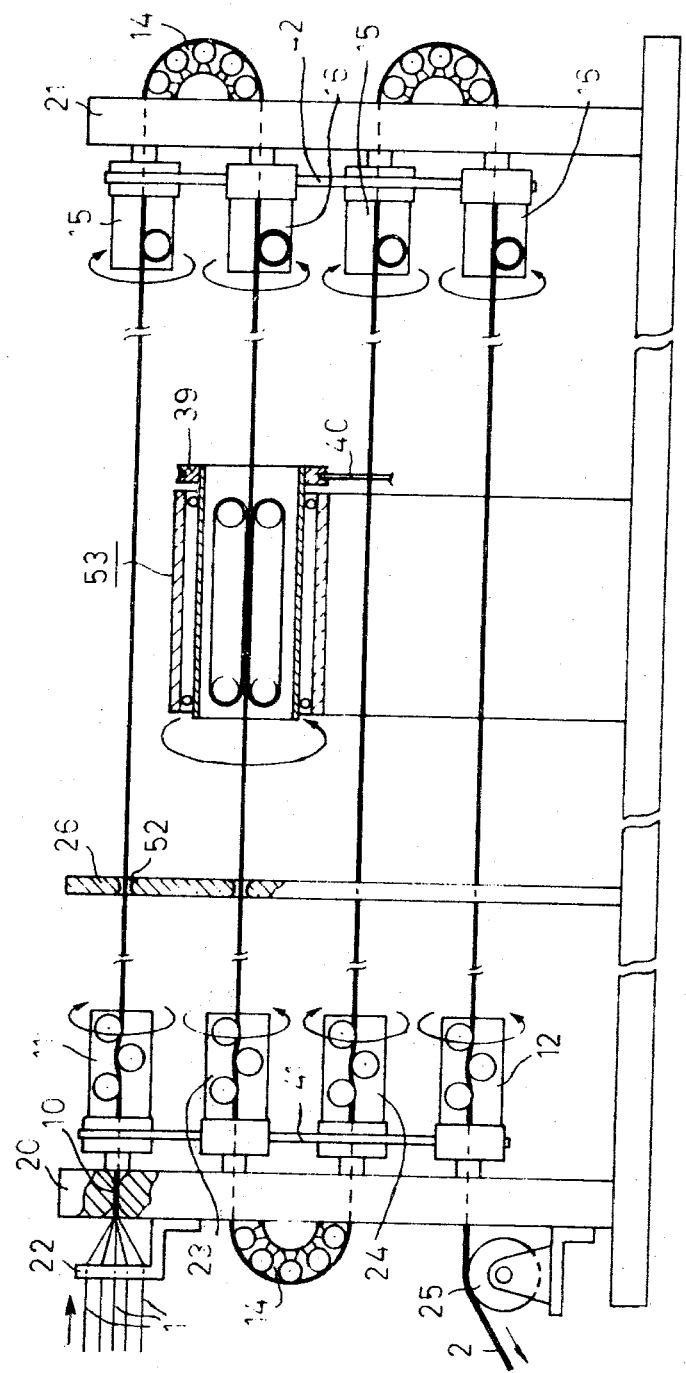
FIGS. 4-14 illustrate individual elements of the SZ twisting apparatus.
Figure 5:
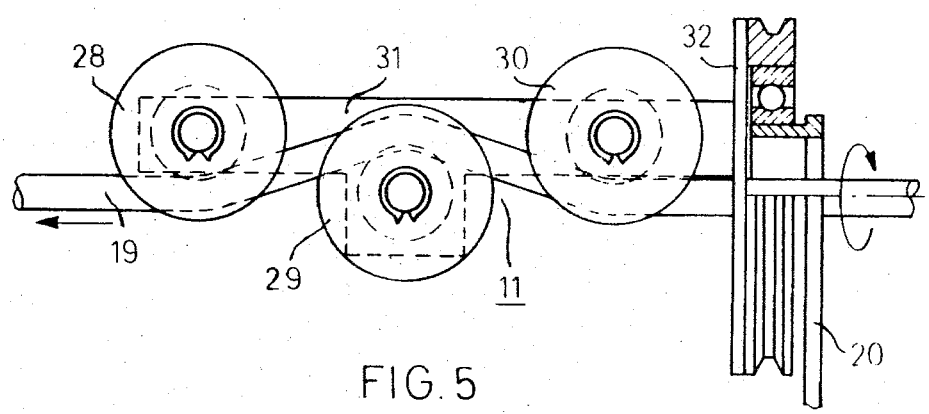

In the embodiment shown in FIG. 4, the two frames 20 and 21 in which the twisting heads of the SZ twisting apparatus are rotatably mounted, are arranged in the planes A and B, as in FIG. 1. The twisting closer 10, preceded by the perforated disc 22, is associated with the twisting head 11, while the deflection pulley 25 is associated with the twisting head 12 as its twisting point. The twisting heads 11, 12, 23 and 24 which are arranged in the frame 20, are designed as so-called three-roller twisters, as shown in FIG. 5. The material 19 to be twisted runs in wave-like fashion between the three rollers 28, 29 and 30, which are together fastened on the frame 31. The latter in turn is fastened to a drive wheel supported in the frame 20.

Figure 6:
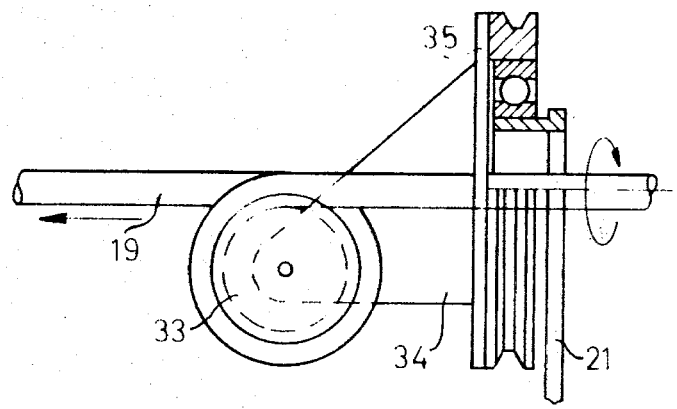

The twisting heads 15 and 16, which are rotatably mounted in the frame 21, are designed as one-roller twisters; the material to be twisted is looped around the roller 33 once, as is shown in FIG. 6. Here, too, the roller 33 is fastened in a frame 34, which is connected to a drive wheel 35 rotatably mounted in the frame 21.

Figure 7:
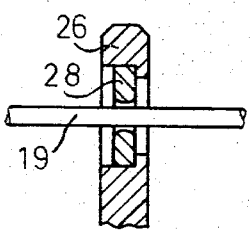
Figure 8:
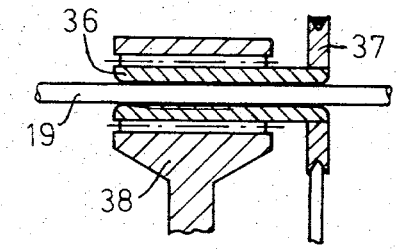

Between the two frames 20 and 21, a frame 26 for straight guides which are designed as nipples 52, is arranged. The nipple diameter is somewhat larger than the diameter of the material to be twisted. Instead of such nipple-like guides, as are also shown in FIG. 7, tubular guides 36, which are shown in FIG. 8, and the inside diameter of which corresponds approximately to the diameter of the material to be twisted, can also be used. The guide tube 36 is connected to a drive pulley 37 which, together with the guide tube, is rotatably mounted in the frame 38. The drive pulley 378 is engaged by a drive belt.

Between the frames 20 and 21 in FIG. 4 is further arranged a rotating pull-off device 53, which is driven via a drive pulley 39 and includes drive belt 40 driven by a drive, not specifically shown, with changing speed of rotation. The pulling-off velocity of the pull-off device is not influenced by the rotary movement.

The twisting heads arranged in the frames 20 and 21 are driven jointly via drive belts 41 and 42, respectively, which are coupled to a motor, not specifically shown.

Figure 9:
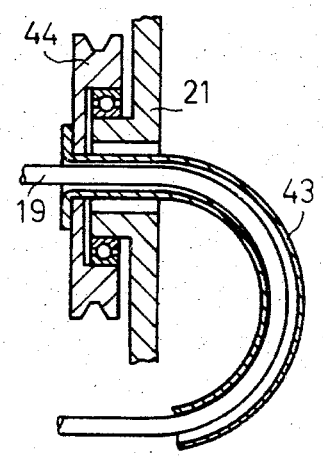
Figure 10:
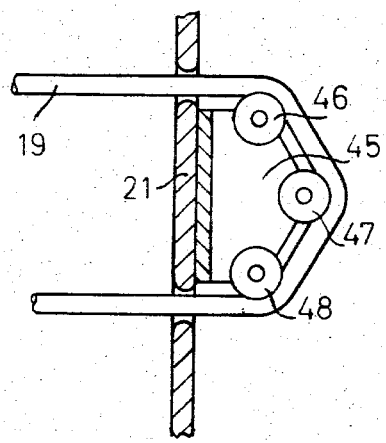
Figure 11:
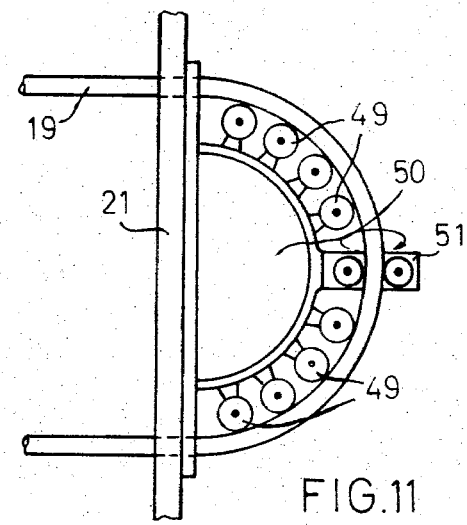

For deflecting the material to be twisted within the twisting apparatus shown in FIG. 4 from one plane into the next-following plane, guides 14 are provided, for which further examples are shown in FIGS. 9 to 11.

FIG. 9 shows a guide which consists of a flexible tube 43 which is bent into a semicircle and is fastened at one end to a drive pulley 44; the latter is rotatably mounted in the frame 21. In the example shown in FIG. 10, an angle piece 45 which carries three deflection rollers 46, 47 and 48, is fastened to the frame 21; the strand 19 is led over these deflection rollers for deflection by 180°.

In the example shown in FIG. 11, a multiplicity of deflection rollers 49 is provided for deflecting the strand 19 by 180°; they are fastened to the support 50. At the center of the guide a twisting head 51, which consists of two pressed-together rollers is located. It is rotatably mounted at the support 50 and exerts additional torsioning on the strand 19 in the region of the deflection.

Figure 12:
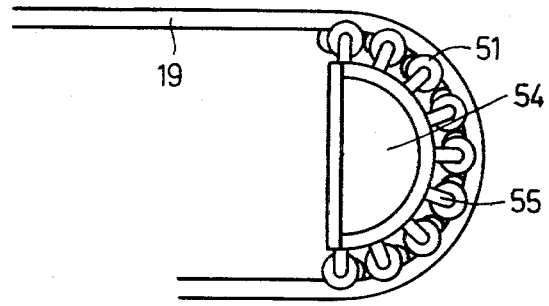

The deflection device shown in FIG. 12 contains, for deflecting the strand 19, a multiplicity of cylinders 51 which are arranged on the support 54 by means of mounting brackets 55. The axes of the cylinders 51 are set at an angle to the axis of the material to be twisted, so that a rotary motion is imparted to the material to be twisted when it runs on the cylinders 51. The inclination of the cylinders 51 can be changed by a suitable fastening of the mounting brackets 55. To this end, the mounting brackets are fastened, for instance, to the support 54 by means of an axle perpendicular to the cylinder axis. The axle connected to the respective mounting bracket, through rotation, leads to different angular positions of the cylinders 51.

Figure 13:
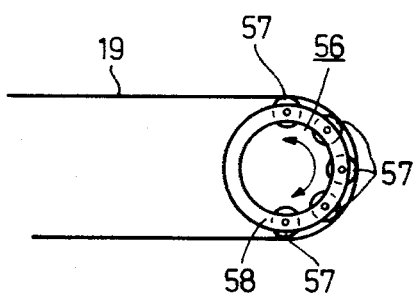

A particularly advantageous embodiment example of a deflection device is shown in FIG. 13. The deflection device 56 consists of five deflection rollers 57 which are supported with their axles at both ends together in a circular ring. The deflection device as a whole is stationary. One or both of the circular rings, however, are rotated about their axis at time intervals, characteristic for the SZ twisting, by a given angle in such a manner that the individual deflection rollers suddenly change their angular position relative to the material to be twisted, which is led over the deflection rollers. Since only very small masses need to be accelerated in this process, the change in the angular position can be accomplished in a very short time.

Figure 14:
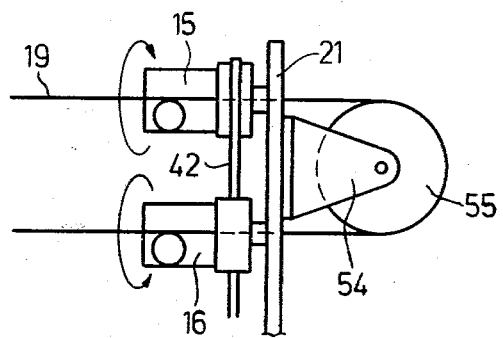

FIG. 14, finally, shows a very simple example of a guide for deflecting the strand 19. The deflection device consists of a single deflection pulley or deflection roller 55, which is supported in the mounting 54 fastened to the frame 21 and with which the two twisting heads 15 and 16 are directly associated. The deflection pulley 55 can be driven by means of a motor and be thus designed as a pull-off device.

In conclusion, an example of the dimensions of the device of the present invention will be given:

Overall length of the accumulator: 85 m
Arrangement of the twisting heads and the guides in four parallel planes.
Storage length of the accumulator $l_0$: 340 m
In each plane, seven straight guides are arranged. There is a rotating pull-off device in the center of the second plane.

The speeds of rotation of the twisting head are varied between 500 and 3500 r.p.m. within one twisting period in three equal increasing and three equal decreasing steps.

Pulling-off velocity v: 100 m/min
Length of lay: 10 cm
Distance L between the reversal points of the twist direction: 1020 m.

What is claimed is:

1. In apparatus for SZ twisting twist elements of electric cables and lines by means of an accumulator which is arranged between a stationary unwind device for the twist elements and a pull-off and take-up device for the twisted material and which includes a first twisting point arranged at the entrance of the accumulator, a second twisting point at the exit of the accumulator and twisting heads arranged immediately behind the first twisting point and immediately ahead of the second twisting point, respectively, said twisting heads rotatable at changing speeds, the axes of rotation of the twisting heads lying on the twisting axis, along which the twist elements assembled into a strand are conducted, the improvement comprising:

(a) a plurality of stationary guides for straight guidance and at least one stationary guide for deflecting the strand formed by the twist elements disposed between the two twisting heads;

(b) said twisting heads and straight guides arranged equiaxially in different planes;

(c) a guide for deflecting the strand being arranged between the last straight guide of each plane and the first straight guide of a next following plane, and (d) means for preventing the development of friction forces between said straight guides and said twist elements.

2. The improvement according to claim 1 wherein said means for preventing comprise at least the straight guides or a portion thereof supported for rotation in the same direction as the twisting heads about the twisting axis.

3. The improvement according to claim 1 wherein guide surfaces of at least the straight guides or of the parts thereof which rest against the twist elements forming a strand rest there against without or almost without force in the circumferential direction thereof.

4. The improvement according to claim 3 wherein said straight guides are arranged in parallel planes and wherein said guides for deflecting the strand have a deflection angle approximately 180°.

5. The improvement according to claim 1, wherein the guide surfaces of the guides for deflecting the strand are disposed so as to rest against the strand, which is continuously rotating about its axis, without or almost without force in the circumferential direction thereof.

6. The improvement according to claim 1 wherein said straight guides are arranged in more than two planes.

7. The improvement according to claim 1 and further including a further twisting head arranged immediately before and after each guide for deflecting the strand, respectively, and said further twisting heads supported for rotation in the same direction as the twisting heads arranged at the entrance and the exit of said accumulator.

8. The improvement according to claim 7 wherein each guide for deflecting the strand comprises a single deflection pulley.

9. The improvement according to claim 8, wherein at least one deflection pulley comprises a pull-off device.

10. The improvement according to claim 7, wherein the twisting heads arranged at the entrance and the exit of the accumulator and the further twisting heads arranged before and after a guide for deflecting the strand are arranged in two parallel planes.

11. The improvement according to claim 10, and further including means for jointly driving the twisting heads arranged together in one plane.

12. The improvement according to claim 1 wherein each straight guides are also designed as twisting heads or consist of tube sections.

13. The improvement according to claim 1, wherein the guide for deflecting the strand comprises three or more guide rollers arranged on a circular arc.

14. The improvement according to claim 1 wherein the guide for deflecting the strand comprises several rolls or cylinders arranged on a circular arc and set at an angle to the axis of the guide.

15. The improvement according to claim 14, and further including means to vary the angle of inclination of the rolls or cylinders.

16. The improvement according to claim 1, wherein each guide for deflecting the strand comprises a flexible hollow shaft.

17. SZ twisting apparatus according to claim 1 and further including at least one pull-off device disposed between the two twisting heads arranged at the entrance and the exit, equiaxially to one of the straight guides and rotatable in the same direction as the twisting heads.

18. The improvement according to claim 17 wherein said parallel planes have a distance of more than 20 m from each other.

19. The improvement according to claim 1 and further including an extruder for jacketing the twisted twist elements and a cooling trough for cooling the jacket disposed between the accumulator and the take-up device, said accumulator arranged parallel to said cooling trough.

20. The improvement according to claim 19, wherein a deflection device for deflecting the twisted twist elements by 180°, comprising a drawing-off pulley arranged between the exit of the accumulator and said extruder.

21. A method for operating an SZ twisting apparatus for twisting twist elements of electrical cables and lines by means of an accumulator which is arranged between a stationary unwind device for the twist elements and a pull-off and take-up device for the twisted material and which includes a first twisting point arranged at the entrance of the accumulator, a second twisting point at the exit of the accumulator and twisting heads arranged immediately behind the first twisting point and immediately ahead of the second twisting point, respectively, said twisting heads rotatable at changing speeds, the axis of rotation of the twisting heads lying on the twisting axis, along which the twist elements assembled into a strand are conducted, said apparatus includes a plurality of stationary guides for straight guidance and at least one stationary guide for deflecting the strand formed by the twist elements disposed between the two twisting heads, twisting heads and straight guides which are arranged equiaxially in different planes, a guide for deflecting the strand arranged between the last straight guide of each plane and the first straight guide of a next following plane, and means for preventing the development of friction forces between said straight guides and said twist elements, comprising synchronously varying the rotary motions of the twisting heads in steps at intervals which correspond to the running time of a cross-section element of the strand between the first twisting point and the second twisting point while the direction of rotation remains the same, alternatingly in at least two increasing and an equal number of decreasing steps.

22. The method according to claim 21, wherein the difference in speed of rotation of two successive steps is always the same.

* * * * *